(12) United States Patent
Bohn et al.

(10) Patent No.: US 6,426,498 B1
(45) Date of Patent: Jul. 30, 2002

(54) OPTICS MODULE FOR OPTICAL SCANNING DEVICE

(75) Inventors: David D. Bohn, Fort Collins; Eugene A. Miksch, Loveland, both of CO (US)

(73) Assignee: Hewlett-Packard Co., Palo Alto, CA (US)

(*) Notice: Subject to any disclaimer, the term of this patent is extended or adjusted under 35 U.S.C. 154(b) by 0 days.

(21) Appl. No.: 09/541,171

(22) Filed: Apr. 3, 2000

(51) Int. Cl.[7] ............................. H01J 3/14; H01J 5/16; H01J 40/14
(52) U.S. Cl. ............................. 250/234; 250/208.1
(58) Field of Search ............................. 250/234, 208.1, 250/235, 216

(56) References Cited

U.S. PATENT DOCUMENTS

| | | | |
|---|---|---|---|
| 5,272,518 A | * 12/1993 | Vincent | 356/405 |
| 5,306,908 A | 4/1994 | McConica et al. | 250/234 |
| 5,381,020 A | 1/1995 | Kochis et al. | 250/566 |
| 5,644,139 A | 7/1997 | Allen et al. | 250/557 |
| 5,936,238 A | 8/1999 | Bohn | 250/234 |
| 6,002,124 A | 12/1999 | Bohn et al. | 250/208.1 |

* cited by examiner

Primary Examiner—Robert H. Kim
Assistant Examiner—Courtney Thomas
(74) Attorney, Agent, or Firm—David M. Mason

(57) ABSTRACT

The present invention provides an optics module for a scanning device such as a portable scanner. The optics module includes an illumination source and guide that transmits light through an optical window of the scanning device casing before reflecting off of the object to be scanned. The reflected light from the object travels back through the optical window and a lens before reaching a photosensor for evaluation by an associated microprocessor. The optical window of the scanning device provides a recessed portion in the scanning device casing. The recessed portion of the window is formed using the functional components of the optics module to eliminate a piece of glass typically used within the optical window that can be easily scratched or broken and provides a loss during the illumination process. By using the functional components of the optics module to form the recessed optical window, manufacturing costs to secure and replace a typical glass window contained therein can be eliminated, size of the optics module is reduced, and any contaminates that gather around the optics module can be easily removed by the user.

25 Claims, 7 Drawing Sheets

OPTICS MODULE FOR OPTICAL SCANNING DEVICE

BACKGROUND OF THE INVENTION

1. Field of the Invention

The present invention relates generally to optical scanner devices and, more particularly to a cost effective and functionally efficient optics module and scan window for an optical scanner device.

2. Description of the Related Art

Optical scanners are well-known in the art to produce machine-readable data that can represent an image contained on an object, e.g. a page of printed text. In general, the data is obtained from an optics module reflecting a beam of light off of a "scan line" region of the object being scanned. When an optics module is used in a portable scanner, the reflected beam of light is obtained as the user physically moves the optical scanner across the object with their hand. Consequently, the optics module for hand-held or portable scanning devices must generally be very compact and often employ a navigational assembly to track and associate what portion of the object has been scanned.

Referring to FIG. 1, the basic components of a portable scanner are shown. The scanner 5 includes an optics module 10 having a scanning assembly 12 and a navigational assembly 14 coupled to an image processing system 30. With each assembly, an illumination device 16, such as one or more LED's, creates a beam of light 18A, 18B that passes through the scanner casing 20 at a scan window 22A, 22B having a transparent material 32. Next, the beam of light 18A, 18B reflects off of the surface of the object 24 being scanned before reflecting back through the scan window 22A, 22B. The reflected beam of light 18A', 18B' is focused by a lens 26 and received by an illumination sensor or photosensor 28.

The photosensor 28 works with other electronic components 30 to evaluate and translate the reflected beam of light 18A', 18B' into an electronic copy of the image contained by the object 24. The electronic components 30 could include a microprocessor, memory and related translational software that is contained by the scanner or by a personal computer being accessable by a data cable.

With the conventional optics modules described above, the illumination source 16 radiates light over a full hemisphere, so only a small portion of the light is directed toward the scan region, and the light flux per unit angle is relatively low. Consequently, if the illumination source 16 is tilted or moved slightly away from the object 24, the illumination level through the scan window 22A and 22B at the scan line falls rapidly, resulting in an undesirably dark image or a very non-uniform image to be captured by the photosensor 28.

The transparent material 32 is made from plastic or glass and functions as a seal in the casing so that the optical and electronic components contained therein can be protected from dust, moisture and other potential contaminants that could possibly damage the operation of the scanner. The transparent material provides optical losses due to surface reflections and internal transmissions. In particular, each time a beam of light 18A or 18A' passes through the transparent material, the beam of light is diminished by about 8%. An anti-reflective coating may be applied to the transparent material to reduce the optical losses, however this will only reduce the optical loss to about 1.5%.

FIG. 2 illustrates a cross-sectional view of how the transparent material 32 may be secured to the scanner casing 20. In particular, FIG. 2 shows how the casing 20 can be manufactured to provide a scan window 22A, 22B that includes a ledge for supporting the transparent material 32 with an adhesive 36. With this structure, the transparent material 32 is positioned a depth "d", between 0.02–0.05 mm, away from an outer surface 38 of the casing 20 to create a recessed border defined by square corner regions 40.

The recessed border is not deep enough to prevent a staple or a hard particle contained on an object from scratching the transparent material while the object is being scanned. In addition, the square corner regions 40 collect dust and other contaminants in areas that are hard to clean. Consequently, the scratches and collected contaminants further increase optical losses in the operational scanner. In turn, such optical losses may force the user to have the manufacturer replace the transparent material, which is not only time consuming, but costly. Lastly, the square corner regions 40 may cause the corners of the object being scanned to become jammed along the recessed borders of the scan window during the scanning process.

Thus, it would be desirable to provide an apparatus that overcomes the above problems associated with an optics module and scan window for a scanning devices.

SUMMARY OF THE INVENTION

In one embodiment, the present invention provides an optical scanner having a casing. The casing includes a scan window, a substrate attached within the casing and being laterally spaced from the scan window, and an optics module coupled between the scan window and the substrate to form a recess within the casing.

In another embodiment, the present invention provides a method for manufacturing a recessed scan window for use in an optical scanning apparatus having a casing. The method includes: forming a contact window within a scan surface of the apparatus casing; securing a substrate within the apparatus casing; coupling a first end of an illumination device to the substrate and a second end adjacent to a first portion of the contact window; and coupling a first end of a photosensor component to the substrate and a second end adjacent to a second portion of the contact window, wherein the second end of the illumination device and the photosensor component forms the recessed scan window.

BRIEF DESCRIPTION OF THE DRAWINGS

Other aspects and advantages of the invention will become apparent upon reading the following detailed description and upon reference to the drawings, in which.

Figure 1:
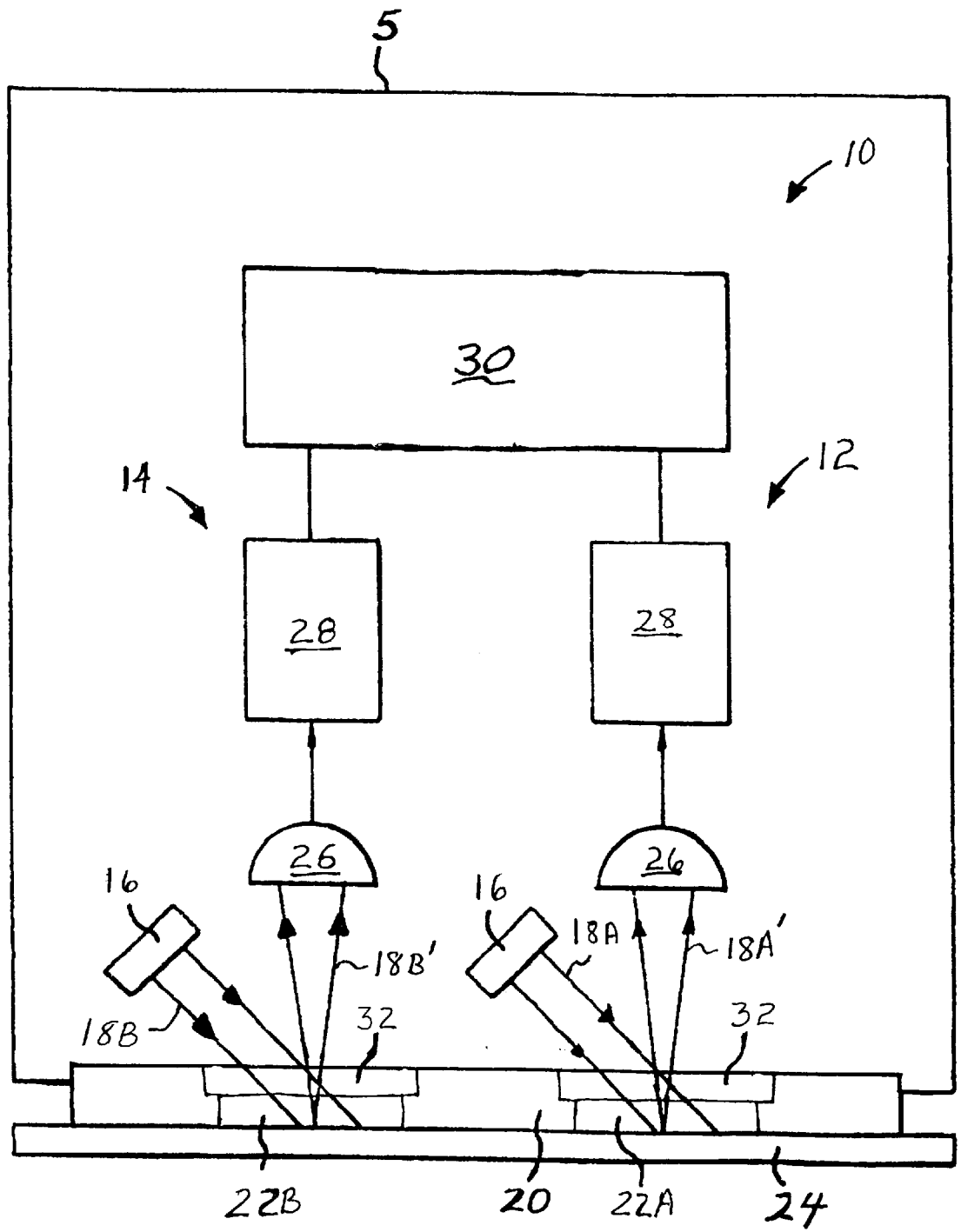
FIG. 1 illustrates a schematic side view of a conventional portable scanner.
Figure 2:
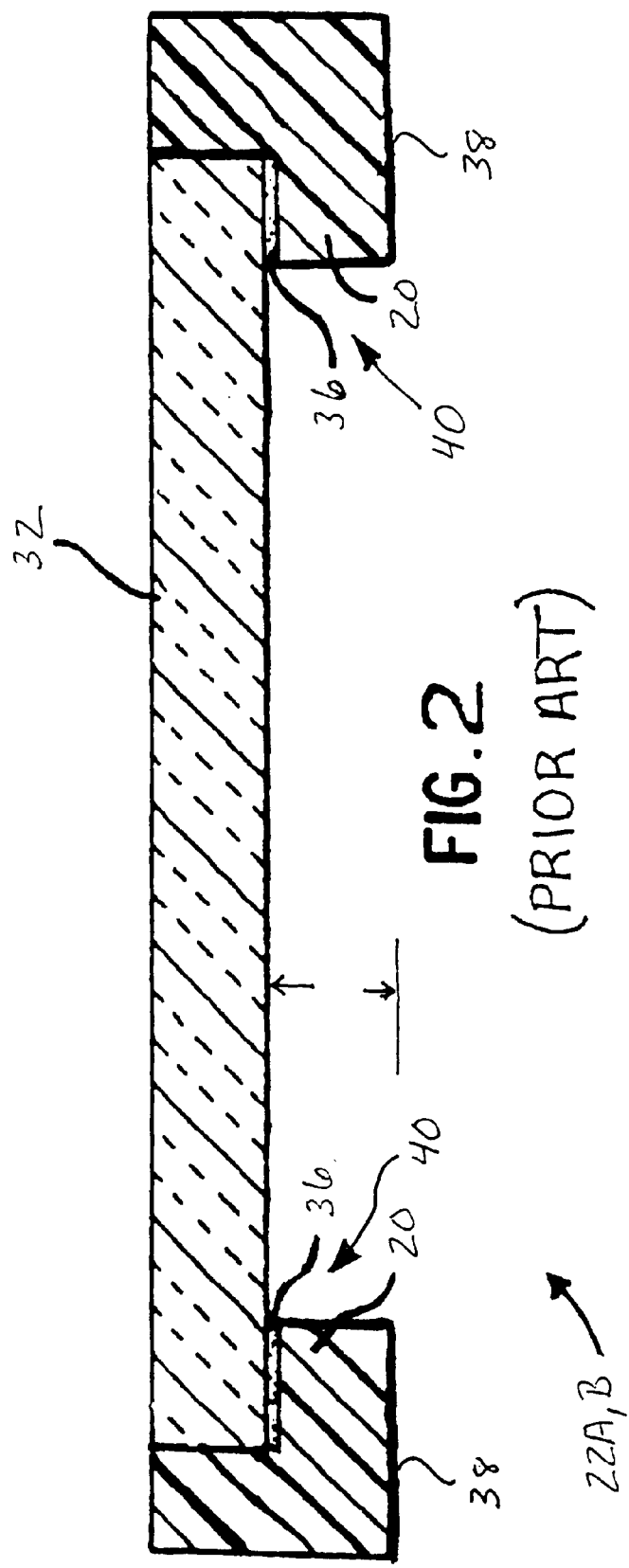
FIG. 2 illustrates a cut-away view of the scan window of FIG. 1.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

In general, the present invention provides an efficient, effective and reliable means for a photoelectric imaging system to obtain machine-readable data, which represents an image on an object, e.g. a page of printed text. More specifically, the present invention provides an optics module for a portable scanner having an illumination and photosensor component coupled between a substrate and a scan window. The illumination component creates a beam of light that can pass through the scan window and reflect off of a portion of an object ("scan line") being positioned under the scan window. The reflected beam of light passes back through the scan window before being received by the photosensor component and evaluated/manipulated by complimentary imaging electronics and software.

The optical loss in the embodiments of the present invention are significantly less than the optical loss in conventional optic modules because the inventive optics module allows for the beam of light to pass and reflect through the scan window without having to pass through a transparent material. This is possible because the inventive structure uses the components of the optics module to define a recess within the scan window that can prevent the electronic components of the portable scanner from operational contaminants or scratching. By eliminating the use of the transparent material, the inventive optics module is less expensive to manufacture and dimensionally smaller in size. The inventive structure for the optics module can be similarly used for a navigational assembly of the optics module.

Figure 3:
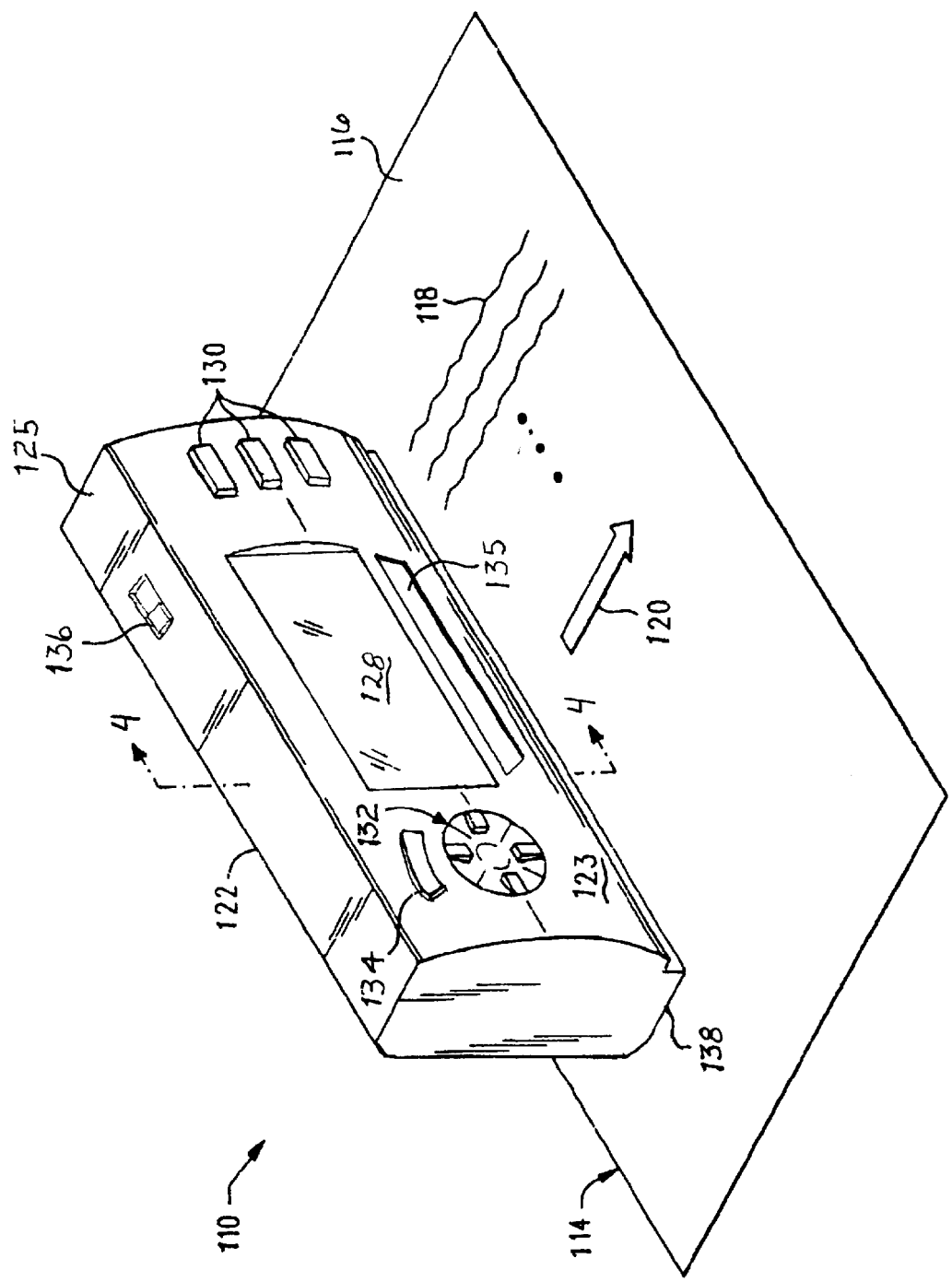
FIG. 3 illustrates an isometric view of a portable scanner according to a first embodiment of the present invention.

Turning now to the drawings, FIG. 3 illustrates a portable scanner 110 in accordance with the present invention. As shown, the hand-held scanner 110 may be used to scan an image 118 of object 114, such as a piece of paper having a surface 116 with written text thereon. The image 118 is scanned by moving the scanner 110 over the document surface 116 in a scan direction generally indicated by arrow 120. The handheld scanner 110 may include an elongated housing or casing 122 for containing the various internal components and systems required for the operation of the scanner, as will be described in greater detail below.

The front side 123 of casing 122 may include a display 128, such as a liquid crystal display ("LCD"), for displaying data and/or function options of the scanner. In addition, the front side 123 may provide a plurality of function buttons 130, scrolling buttons 132, an enter button 134, a scan button 135 and an on/off switch 136. The buttons 130 may be used to control the various functions of the hand scanner 110 including: to initiate and terminate scanning of the image 118, to transfer a scanned image to a computer being coupled by a data cable, to zoom in on or out of the displayed image, and to delete a scanned image from memory.

Figure 4:
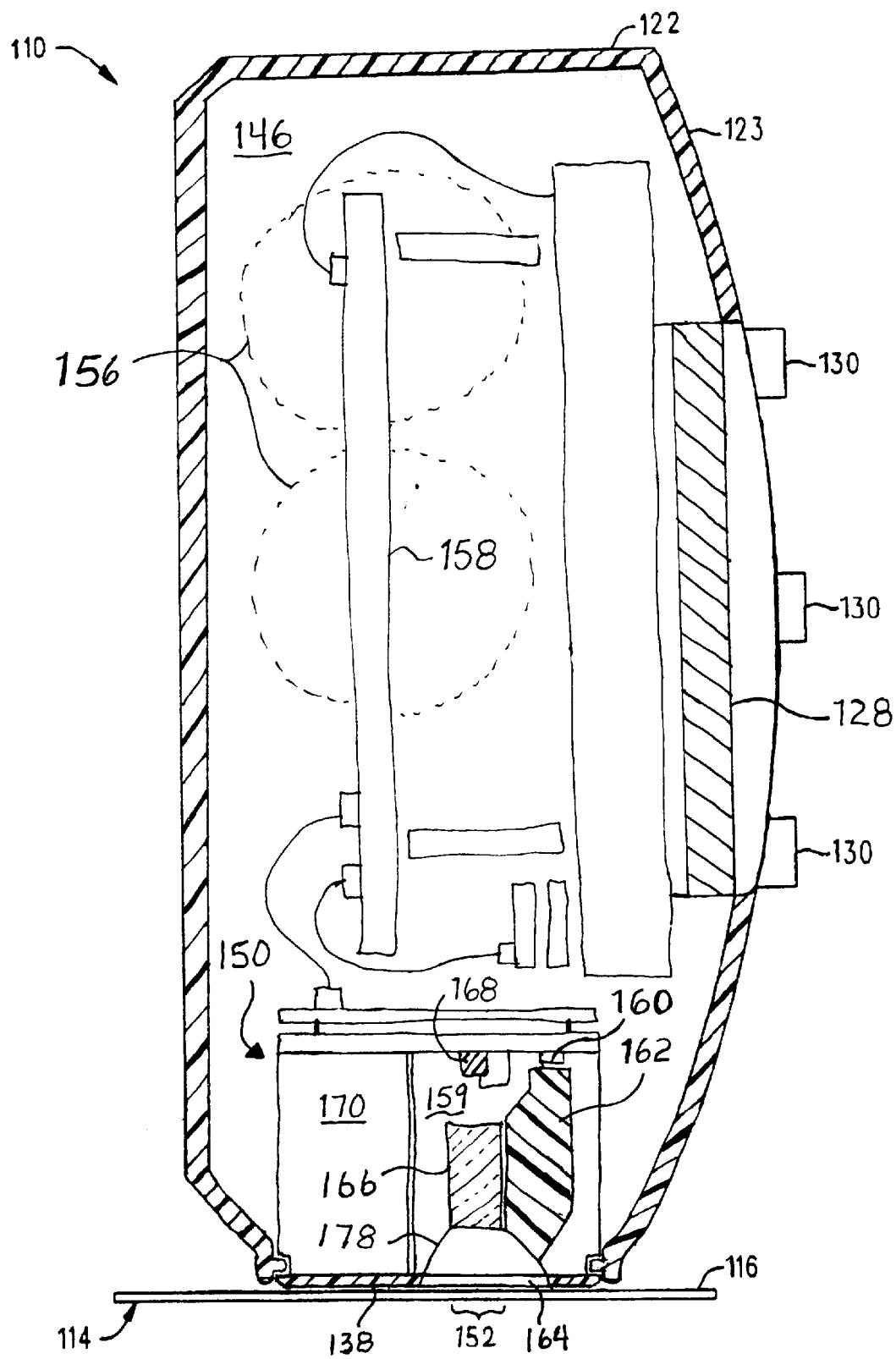
FIG. 4 illustrates a cross-sectional view of FIG. 3 taken along reference line 4.

Referring now to FIG. 4, a cut-away view of the portable scanner 110 is shown as taken along reference lines 4 of FIG. 3. As illustrated, the interior 146 of casing 122 is adapted to receive the optics module 150, the LCD 128, a power source 156, and an image processing system ("IPS") 158. In general, the optics module 150 includes a scanning assembly 159 and an area 170 for containing a navigational assembly 174, if desired (see FIG. 6B or 7B). The optics module does not require a navigational assembly to operate, nor does the navigational assembly take-up as much room in the casing 122 as the scanning assembly 159.

As will be described in more detail below, the scanning assembly 159 illuminates a scanning region or scan line 152 with an array of light emitting diodes ("LEDs") 160 and a light guide 162. The scanning region 152 is within a scan window 164 of scanning surface 138. The light used to illuminate the scan region 152 is reflected off of the document surface 116 and received by a lens 166. The lens 166 carries the reflected light to photosensor 168.

The IPS 158 (a block diagram of which is illustrated in FIG. 8) receives data signals from the photosensor device 168 and processes the data signals as necessary to produce digital image data that the user can view on the display 128. The IPS 158 may also control the other functions and operations of the scanner 110, as described above. The above components are coupled to one another in a conventional manner. The casing 122 of scanner 110 may be manufactured by a conventional method, such as injection molding and include other components and/or systems that may be necessary or desirable for the hand scanner apparatus 110 to operate.

For further detail regarding the components and operational systems of a Handheld or portable optical scanner, the following references are incorporated herein for all that they disclose: U.S. Pat. No. 5,381,020 of Kochis, et al., for "Hand-Held Optical Scanner with Onboard Battery Recharging Assembly," U.S. Pat. No. 5,306,908 of McConica for "Manually Operated Hand-Held Optical Scanner With Tactile Speed Control Assembly", and U.S. Pat. No. 5,936,238 of David Bohn for "Portable Optical Scanning Device With A Recessed Optical Window."

Figure 5A:
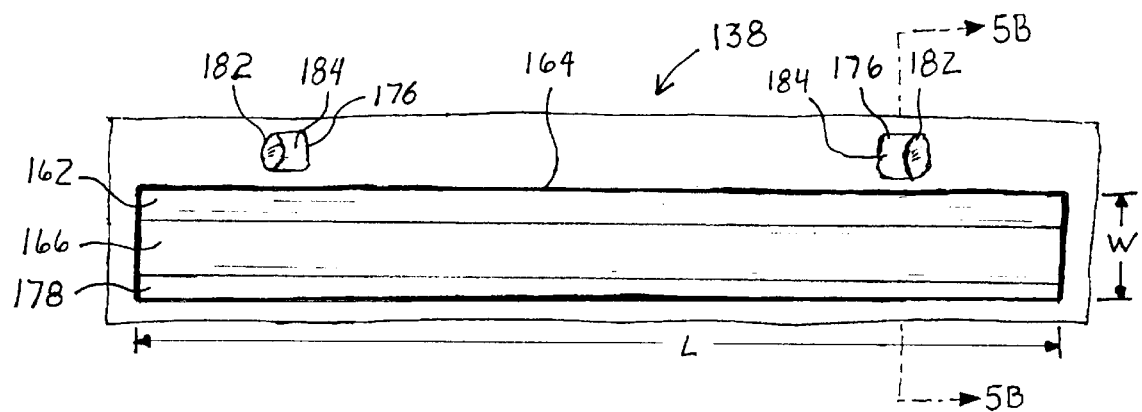
FIGS. 5A and 6A illustrate a plan view of the scanning surface in accordance with the first and a second embodiment of the present invention.
Figure 5B:
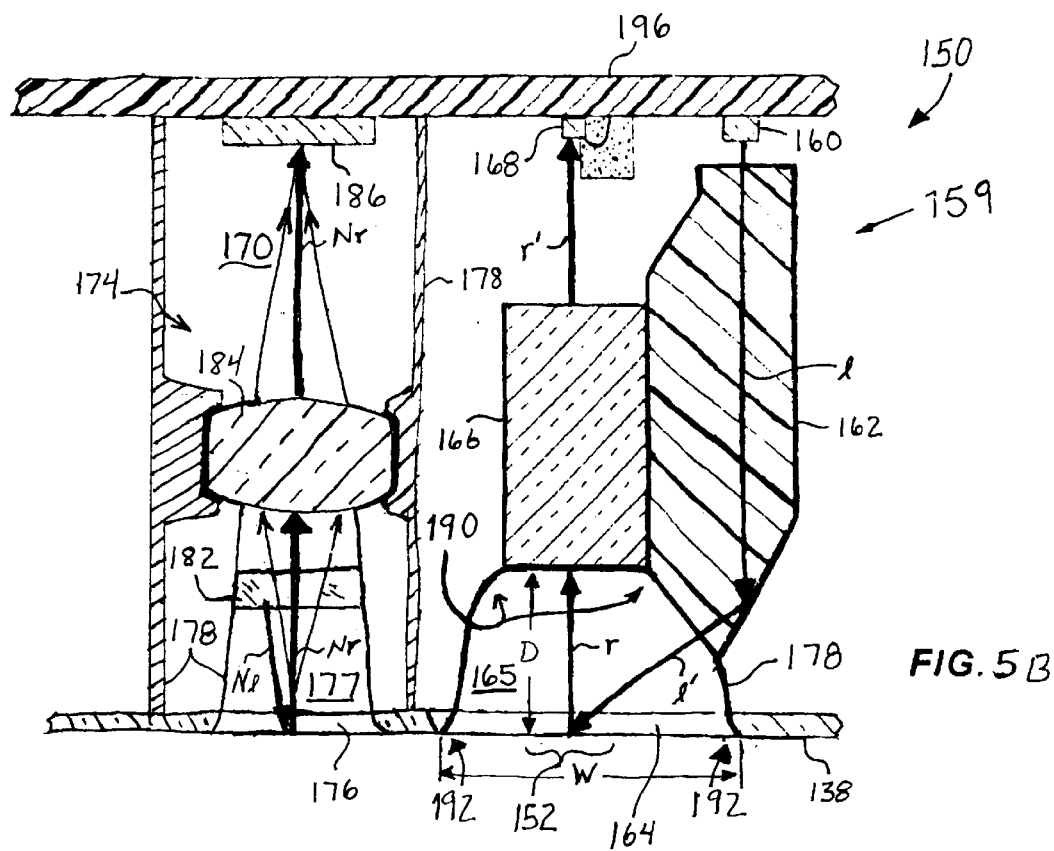
FIGS. 5B and 6B illustrate a detailed cut-away view of the optics module in accordance with the first and second embodiment of FIGS. 5A and 6A, respectively, taken along reference lines 5B and 6B.

Referring to FIGS. 5A and 5B, the scanning surface 138 and optics module 150 are shown. In this embodiment, the scanning surface 138 provides a scan window 164 for the scanning assembly 159 and a navigational window 176 for the navigational assembly 174. The scan window 164 provides a recess 165 being defined by the scanning window 164, the light guide 162, the lens 166 and the reflective material 178 on either side of the light guide and lens. Similarly, the navigational window 176 provides a recess 177 being defined by navigational window 176, the light source 182, the lens 184 and the reflective material 178 on either side of the light source and lens. The navigational assembly 174 is laterally separated from the scanning assembly 159 by the reflective material 178 being coupled between the casing 122 and substrate 196.

During the operation of the scanning assembly 159 of FIGS. 5A and 5B, the illumination source 160 produces a ray of light that follows a light path 1. The light path 1 internally reflects from the sides of the solid light pipe and follows reflected light paths 1' out of the solid light pipe and optics module 150 to a scan region 152 under the lens 166. Image light 1' being reflected from the object 114, travels along a light path r where it is focused by the lens 166, such as a "SELFOC" lens, before reaching the photosensor 168. The optical detector 168 produces electrical signals representative of the image light for the IPS 158 (see FIG. 4) to process and manipulate for display or downloading.

At the same time, the navigational assembly 174 detects and tracks movement of the optic module 150 over the object 114. More specifically, each light source 182, such as an LED, creates a beam of light ("N1") that is reflected off of the document surface 116 in a direction parallel with the length ("N1") of scan window 164. Next, the navigational sensor 186 receives the reflected light ("Nr") through the navigational lens 184. The navigational sensor 186 uses the reflected light ("Nr") to provide position information, which is paired with the swaths of image data provided by the optical detector 168. A stitching algorithm can then use the position information to create a complete image of the object 114 from the scanned image swaths.

Figure 6A:
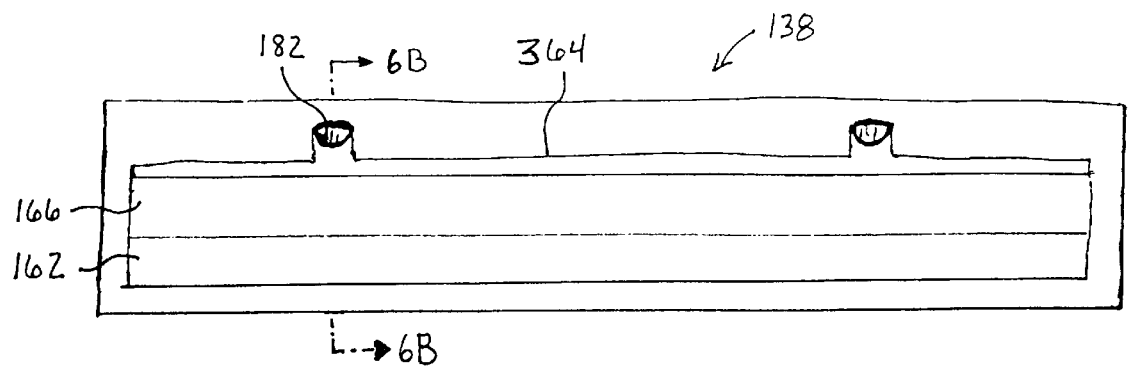
Figure 6B:
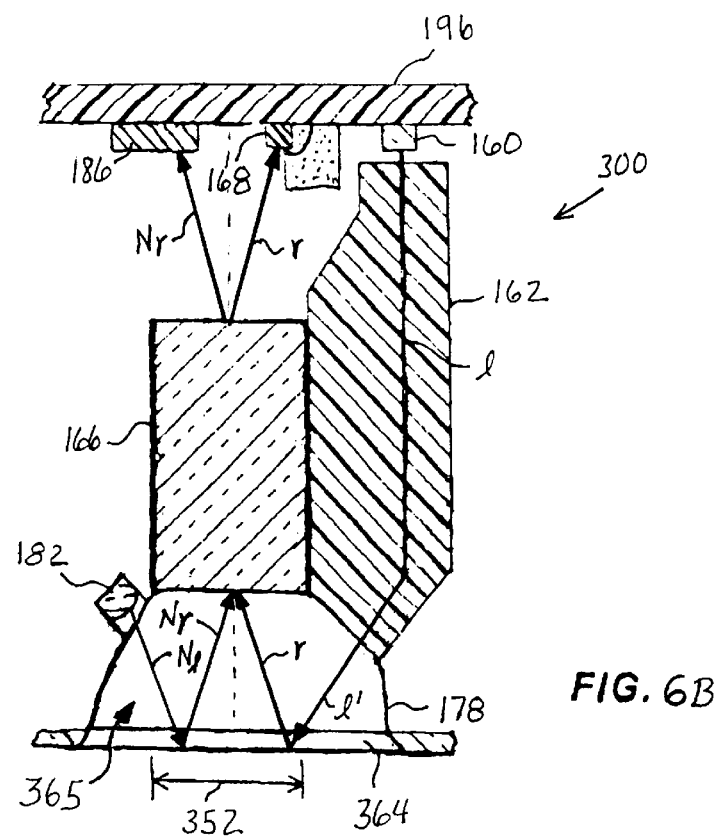

Referring now to FIGS. 6A and 6B, an alternative structure is shown for the optics module 150 of FIGS. 4, 5A and 5B. In this embodiment, the optics module 300 rotates the navigational window 176 and recess 170 of FIGS. 5A and 5B by 90 degrees. This rotation allows the lens 166 of the scanning assembly 159 to receive the light beam of the navigational light source 182 after being reflected off of the document surface 116 being scanned. With this embodiment, the known properties of a "SELFOC" lens are used to separate and guide the reflected light beams of the scanning assembly and navigational assembly to their respective photosensors 168 and 186. In other words, with this embodiment, the same components and structure is used for the scanning assembly as described above, however the navigational lens 184 is eliminated for the navigational assembly and the navigational scan path is rotated 90 degrees.

During the operation of the optics module 300 of FIGS. 6A and 6B, the illumination sources 160 and 182 produce a ray of light that follows a light path 1 and N1, respectively. Similar to the previous embodiment, light produced by illumination source 160 is captured by light guide 162. The captured light internally reflects from the sides of the light guide to follow light paths 1 and 1' out of the solid light pipe, through the scan window 364 and onto a scan region 352 under the lens 166. In contrast, the light from the navigational light source follows the light path N1 through the scan window 364 and onto a scan region 352 under the lens 166. Consequently, light from each illumination source 160 and 182 follows a light path r and Nr, respectively, through the lens 166 to the optical detectors 168 and 186. The known properties of the lens 166 allows for each source of light entering into the lens at a different angle to be captured by their respective photosensor 168 and 186 upon their exit from the lens. The optical detectors 168 and 186 transfer the reflected light to the IPS 158 so that electrical signals can be produced to represent the image light.

The above embodiment allows for further cost and space reductions over the first embodiment by eliminating the need for a navigational lens 184 and window 176 (see FIGS. 5A and 5B). Consequently, less space is needed on the substrate 196, less reflective material 178 will be used, and the weight and power consumption of the scanner will be reduced.

The component layout and operation for a preferred and alternative embodiment of the present invention have been described above. The following will provide more detail for each component used by both embodiments. The reflective material used in the above embodiment is conventional, such as a black plastic, and couples to the distal end of the scanning and navigational assembly components by a conventional method to seal each recess from contaminants reaching any other surface of the components contained by the casing 122. In addition, the reflective material provides a smooth radii surface structure within each recess to avoid the accumulation of dust or other contaminants from gathering at the inner corners 190, to provide easy cleaning, and to prevent the edge of a document surface 116 (see FIG. 4) from catching on the outer corners 192 while being scanned (see FIGS. 4 and 5B). If desired, the reflective or containing material 178 could be removed so that only the lens 166 and light guide would define the recess of the scan window.

In the specific embodiments of the instant invention, the width ("W") of the scan windows 164 and 364 is approximately 1–4 mm for the length ("L") of the scanning region 152. This distance is wide enough to permit a scan line of data to be obtained, but sufficiently narrow to prevent the document from bowing up into the recess portion 165. The depth "D" of the recessed portions 165 and 365 is between about 1.5 and 5 mm. This depth should eliminate the chance of a staple or a particle on the document surface 116 from scratching any component of the scanning assembly.

The width and length of the navigational windows 176 in FIGS. 5A and 5B is much smaller than the width and length of the scanning windows 164 and 364. This is primarily due to the fact that the navigational windows 176 are laterally spaced from each other along the length "L" of the scanning window 164. In turn, the navigational window 176 only has to accommodate a light beam "N1" from a single LED 182 that reflects off of the object 114 in the direction of the length "L" before being received by a navigational lens that feeds the reflected light "Nr" to the navigational photosensor 186. The depth of the navigational window 176 (i.e., the distance from the scanning surface 138 to the surface of the lens 184 closest to the scanning surface 138) may be between about 3 to 5 mm.

The image detectors or photosensors 168 and 186 and the illumination sources 160 and 182 mount to a single substrate 196, such as a printed circuit board ("pcb"). The printed circuit board 196 is preferably mounted to the casing 122, which provides a compact structure for the optics module 150. The pcb 196 may also include a plurality of conductors, such as printed circuit paths (not shown), to electrically connect the various LEDs 160 to a suitable connector node or pad (not shown) on pcb 196. The connector node or pad (not shown) in turn may be connected to a suitable LED driver circuit, such as a pulse width modulation circuit, by any of a wide variety of electrical conductors, such as flexible insulated wire, etc. Lastly, pcb 196 may include a pair of spot-light LEDs 182 for the navigational assembly 177.

The illumination source 160 may include an array of light emitting diodes ("LEDs") arranged along an elongate surface of the pcb 196. The lens 166 for the scanning assembly is preferably a "SELFOC" lens, manufactured by NSG ("Nippon Sheet Glass"). The lens 184 for the navigational assembly of the embodiment of Figures 5A and 5B is preferably a conventional bi-convex single element imaging lens made by plastic injection molding from materials such as acrylic polycarbonate. Each lens directs and focuses reflected light from the object 114 onto the optical detector 168. The photo sensor 168 is a conventional CMOS linear array.

The light guide 162, positioned under the illumination source 160, is mounted to the lens 164 and the casing 122. In a preferred embodiment, the light guide 162 comprises a solid light pipe. The solid light pipe may be made from any substantially transparent material having an index of refraction greater than that of air. As a result of the index of refraction, light rays may pass into and out of the solid light pipe only when the rays are at near normal angles with respect to the sides of the light pipe. Any light rays striking the sides of the solid light pipe with angles of incidence greater than the critical angle of incidence for the light pipe material will be internally reflected.

The top of the solid light pipe is perpendicular to the preferred direction of illumination of the scan region, such as along the illustrated reflected light path. Stray light baffles or reflectors may be placed alongside the illumination source to direct the light rays into the solid light pipe. In addition, the top of the solid light pipe may be slightly textured if desired to diffuse the light from the illumination source 160 as it enters the light pipe. For further details about light guides that may be implemented with the present invention, see U.S. patent application Ser. No. 09/477,205 of David Bohn for "Contact Image Sensor With Light Guide," which is hereby incorporated by reference for all that it discloses.

Figure 7:
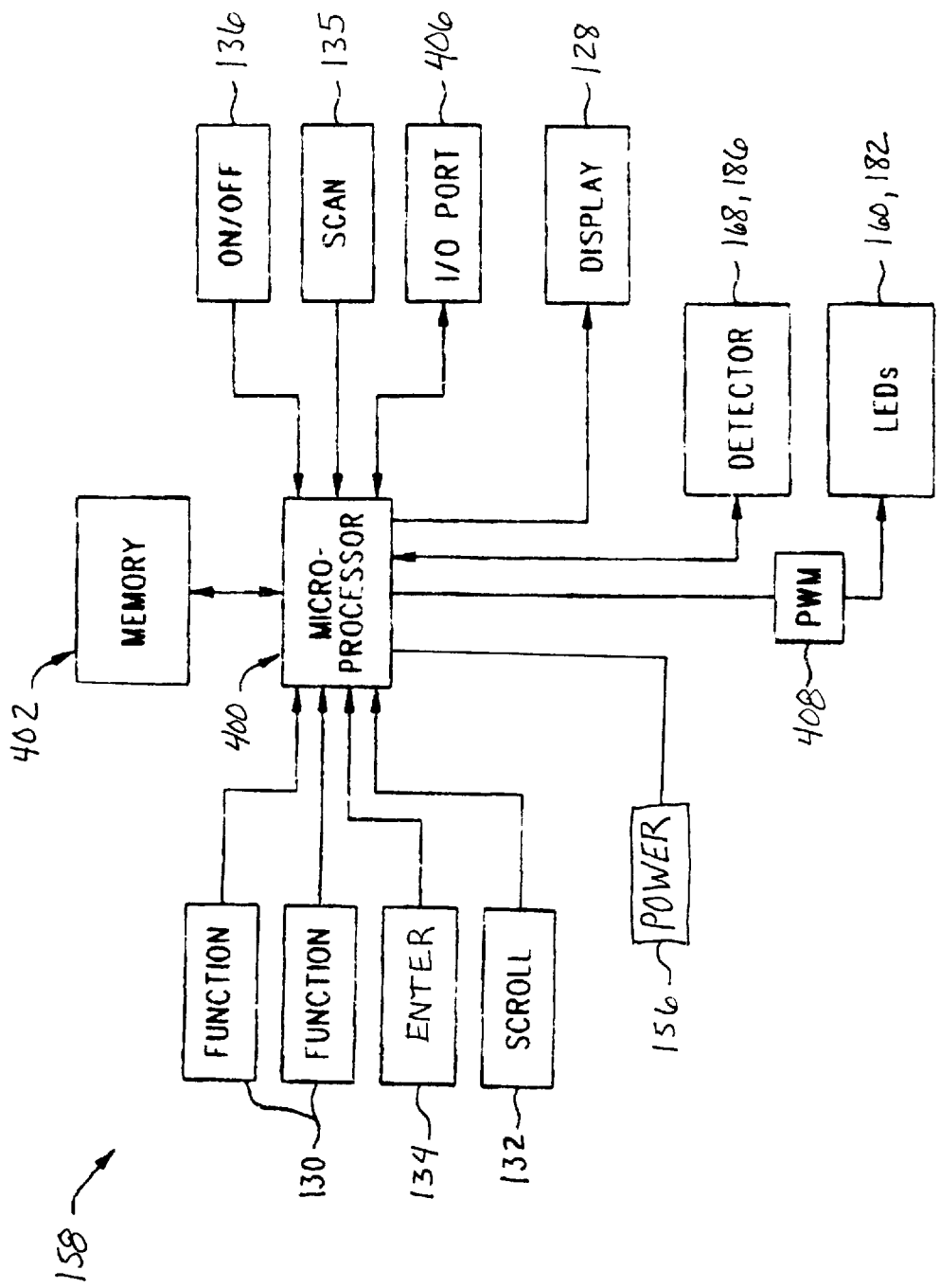
FIG. 7 illustrates a high-level block diagram of the image processing system in accordance with the present invention for the above embodiments.

Referring to FIG. 7, a description of the image processing system 158 will now follow. However, since the details of the IPS 158 are not necessary to understand or practice the present invention, the particular circuit components or the functions that they provide will only be generally described below.

Essentially, the image processing system 158 may comprise a microprocessor assembly 400 conventionally coupled to a memory system 402 for collecting and processing the image data provided by the scanning and navigational photosensors 168 and 186. As mentioned earlier, the various function buttons 130, scrolling buttons 132, enter button 134, scan button 135, and on/off switch 136 are also connected to the microprocessor 400 having a power supply 156, such as two 'AA' or 'AAA' batteries or power cord. The various buttons interact with a software program executed by the microprocessor 400 to control the various functions and operations of the scanner 110.

The display system 128 is also connected to the microprocessor 400 and may be used to show the user data relating to the scanning operation. Of course, the photosensors 168 and 186 are also connected to the microprocessor 400 having an input/output (I/O) port 406 to allow data to be exchanged with external devices, such as a computer (not shown). I/O port 406 may comprise a standard serial or USB port or may comprise an infrared port.

With either embodiment, the inventive optics module for a scanning apparatus can produce a quality digital image of a scanned object. In particular, once the user turns on the power 136 and activates the scan button 135, the IPS will activate the scanning processes as described above. If the length ("L") of the scanning window 164 is not as wide as the object 114 to be scanned, the optics module 150 is swept over the object 114 in a curvilinear or meandering fashion during a scanning operation. This sweeping action produces connected image strips or swaths which must then be stitched together by a stitching algorithm to produce a complete image of the object 114.

Examplary navigation systems and stitching algorithms that could be used with the present invention are disclosed in U.S. Pat. No. 5,644,139 of Allen et al. for "Navigation Technique for Detecting Movement of Navigation Sensors Relative to an Object", U.S. Pat. No. 6,002,124 of Bohn et al. for "Portable Image Scanner with Optical Position Sensors," and U.S. patent application Ser. No. 09/343,880 of David Bohn et al. for "Integral Positioning and Imaging Device" filed Jun. 30, 1999, all of which are specifically incorporated herein by reference for all that they disclose.

In summary, the optics module of the above embodiments may be used in any imaging device such as a scanner or fax machine to capture the image of an object. The above inventive structure eliminates the need for a transparent material to be positioned between the document surface and the components of the optics module. Consequently, the user will not experience optical losses due to particles or staples on the document surface that typically scratch a transparent material used to seal the casing and protect the components of the optics module. In addition, the combination of the depth, narrow width and smooth radii at the corners of the recessed scan window, permits the scan surface to flatten the document without the document bowing into the recessed window and helps to prevent dust particles from accumulating in the recessed scan window. If contaminants do collect, the user can easily clean the recessed scan window.

In a conventional optics module, the LEDs typically radiate light over a very wide range of directions, most of which are not aimed at the scan line. The light guide of the instant invention redirects this light toward the scan line. Correspondingly, the light guide reduces stray light inside the optics module and provides improved depth of illumination of the scan region on the object.

The inventive optics module having the light guide directs the light from the illumination source onto the scan region so that even if the optics module is tilted or moved slightly away from the object, the image does not darken as rapidly. Since the light is more focused and directed toward the scan region, the flux per unit angle is greater and the intensity does not drop off as quickly with an increase in distance from the illumination source. The light guide also reduces the non-uniform spot-light effect which increases with distance as a conventional optics module is moved away from the object.

The inventive optics modules are more compact and less expensive than previous optics modules. Without a light guide, the illumination source is typically mounted on a separate circuit board that is positioned close to the scan region at an angle. In addition, a transparent material is positioned within the scan window of the casing to protect the closely positioned illumination source. The light guide removes the need for an additional circuit board, with its attendant wires, electrical interconnect and mounting hardware, and the need for the transparent material that can be easily scratched and collect contaminants. The optics module with a light guide and without a transparent material is thus simpler to assemble, costs less, and is less prone to failure. The optics module with a light guide allows a smaller and lighter scanner, fax machine, or other imaging device.

What is claimed is:

1. An apparatus for producing machine-readable data representative of an image contained by an object comprising:

(a) a casing having a scan surface, the scan surface provides a scan window that extends a length and a width;

(b) a substrate coupled within the casing along the length and the width at a location vertically separated from the scan window;

(c) a photosensor component coupled between the substrate and the scan window along the length;

(d) an illumination device coupled adjacent the photosensor component and between the substrate and the scan window along the length, wherein a portion of the photosensor component and illumination device defines a recess within the scan window; and (e) a containing wall positioned within the casing and extending from the surface of the scan window to a portion of the photosensor component and the illumination device positioned closest to the scan window, the containing wall seals the recessed scan window with the casing.

2. The apparatus of claim 1, wherein the recessed scan window seals the casing.

3. The apparatus of claim 1, wherein the recess of the scan window is approximately 1–4 mm in width for the length of the scan line.

4. The apparatus of claim 1, wherein the recess of the scan window provides a depth of between about 1.5 and 5 mm for the length of the scan line.

5. The apparatus of claim 1, wherein the recessed scan window is configured to maintain a non-contact relationship with the object while the object is being imaged.

6. The apparatus of claim 1, wherein the photosensor component further includes a photosensor coupled to the substrate and a lens coupled between the photosensor and the scan window.

7. The apparatus of claim 6, wherein the lens is a SELFOC lens.

8. The apparatus of claim 1, wherein the illumination device further includes an array of LED's coupled to the substrate and a light guide coupled between the array and the scan window.

9. The apparatus of claim 8, wherein the light guide is a light pipe.

10. The apparatus of claim 1 wherein the recessed window is integrally formed with the casing to provide a radii-smooth surface transition from the scan window to the portion of the photosensor component and illumination device.

11. The apparatus of claim 1, further including a navigational assembly coupled adjacent the photosensor component and between the substrate and the scan window along the length, wherein the navigational assembly creates a recessed navigational window within the scan surface.

12. The apparatus of claim 11 wherein the navigational assembly further includes a light source and an image detector coupled between the substrate and the recessed navigational window.

13. The apparatus of claim 12 wherein the navigational assembly further includes a lens coupled between the image detector and the recessed navigational window.

14. An optical scanner comprising:

a casing having a scan window;

a substrate attached within the casing and being laterally spaced from the scan window;

an optics module coupled between the scan window and the substrate to form a recess within the casing;

a navigational window being located within the casing, adjacent the scan window; and a navigational assembly being coupled within the optics module and between the substrate and the navigational window to define another recess within an interior portion of the casing, and having an image detector coupled to the substrate, a lens coupled between the navigational window and the image detector, and a light source coupled between the substrate, the lens, and the navigational window.

15. The scanner of claim 14, wherein the optics module further includes a scanning assembly having a photosensor component and an illumination device.

16. The scanner of claim 15, wherein illumination device further includes a light source coupled to the substrate and a light guide coupled between the light source and the scan window to define a portion of the recessed scan window.

17. The scanner of claim 15, wherein photosensor component further includes a photosensor device coupled to the substrate and a lens coupled between the photosensor device and the scan window to define a portion of the recessed scan window.

18. The scanner of claim 17, wherein the optics module further includes a navigational assembly being coupled between the substrate and the scan window to form still another portion of the recessed scan window.

19. The scanner of claim 18, wherein navigational assembly further includes:

an image detector coupled to the substrate and adjacent to the photosensor component, and a navigational light source positioned to provide a light beam through the scan window before being received by the image detector.

20. An image scanning apparatus comprising:

a casing having a scan surface with a recessed scan window;

a substrate coupled within the casing at a location vertically separated from the scan window;

a photosensor;

an illumination device; and a containing wall positioned within the casing and extending from the surface to a portion of the photosensor and the illumination device positioned closest to the scan window, the containing wall defines the recessed scan window.

21. An image scanning apparatus comprising:

a casing having a scan surface with recessed scan and navigational windows;

a substrate coupled within the casing at a location vertically separated from the scan window;

a photosensor component coupled to the casing;

an illumination device coupled to the casing, wherein an end portion of the photosensor component and illumination device define the recessed scan window; and a navigational assembly having a light source and an image detector coupled between the substrate and the recessed navigational window.

22. An optical scanner comprising:

a casing having a scan window;

a substrate attached within the casing and laterally spaced from the scan window;

an optics module coupled between the scan window and the substrate to form a recess within the casings a navigational window located within the casing, adjacent the scan window; and a navigational assembly being coupled within the optics module and between the substrate and navigational window.

23. The scanner of claim 22, wherein the navigational assembly further includes an image detector coupled to the substrate, a lens coupled between the navigational window and the image detector, and a light source coupled between the substrate, the lens, and the navigational window.

24. The scanner of claim 22, wherein the navigational window defines another recess within an interior portion of the casing.

25. An optical scanner comprising:

a casing having a scan and navigational window;

a substrate attached within the casing and being laterally spaced from the scan window; and an optics module coupled between the scan window and the substrate, wherein the module includes:

a scanning assembly having a photosensor component and an illumination device which define a recessed portion of the scan window; and a navigational assembly having an image detector and a navigational light which define a recessed portion of the navigational window.

* * * * *